(12) United States Patent
Takada et al.

(10) Patent No.: US 11,445,250 B2
(45) Date of Patent: Sep. 13, 2022

(54) CONTENT DISTRIBUTION DEVICE

(71) Applicant: Funai Electric Co., Ltd., Osaka (JP)

(72) Inventors: Naoto Takada, Osaka (JP); Masanori Ujino, Osaka (JP); Shinsuke Matsumoto, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 109 days.

(21) Appl. No.: 16/299,605

(22) Filed: Mar. 12, 2019

(65) Prior Publication Data

US 2019/0289364 A1 Sep. 19, 2019

(30) Foreign Application Priority Data

Mar. 19, 2018 (JP) .............................. JP2018-050980

(51) Int. Cl.
| | |
|---|---|
| *H04N 7/16* | (2011.01) |
| *H04N 21/454* | (2011.01) |
| *H04N 21/436* | (2011.01) |
| *H04N 21/4363* | (2011.01) |
| *H04N 21/475* | (2011.01) |

(Continued)

(52) U.S. Cl.
CPC ....... *H04N 21/454* (2013.01); *H04N 21/4181* (2013.01); *H04N 21/43615* (2013.01); *H04N 21/43632* (2013.01); *H04N 21/4755* (2013.01); *H04N 21/4825* (2013.01);

(Continued)

(58) Field of Classification Search
CPC ....... H04N 21/43615; H04N 21/42204; H04N 21/2143; H04N 21/43632; H04N 21/43637; H04N 21/4622; H04N 21/47202; H04N 21/435; H04N 21/4348; H04N 21/4126; H04N 21/4345; H04N 21/454; H04N 21/4181; H04N 21/4755; H04N 21/4825; H04N 21/4532; H04N 7/163; H04N 21/4627; H04N 21/41407; H04N 21/4668; H04N 21/26241; H04N 21/4383; H04N 21/462

See application file for complete search history.

(56) References Cited

U.S. PATENT DOCUMENTS 8,079,030 B1 * 12/2011 Satish .................... H04L 63/20
 718/1
2001/0037465 A1* 11/2001 Hart, III ............. H04N 21/2225
 726/28

(Continued)

FOREIGN PATENT DOCUMENTS

| CN | 10430514 A | 1/2015 |
|---|---|---|
| EP | 2 175 650 A1 | 4/2010 |

(Continued)

OTHER PUBLICATIONS

The extended European Search Report of the European Application No. 19163053.2, dated Jul. 12, 2019.

*Primary Examiner* — Annan Q Shang

(74) *Attorney, Agent, or Firm* — Global IP Counselors, LLP

(57) ABSTRACT

A content distribution device includes a communication component and a controller. The communication component communicates with an access point device having a plurality of identifiers. The controller sets a distribution related condition related to a distribution of content for each of the identifiers.

18 Claims, 13 Drawing Sheets

(51) Int. Cl.
*H04N 21/482* (2011.01)
*H04N 21/418* (2011.01)
*H04N 21/45* (2011.01)
*H04N 21/4627* (2011.01)
*H04N 21/414* (2011.01)

(52) U.S. Cl.
CPC ....... *H04N 7/163* (2013.01); *H04N 21/41407* (2013.01); *H04N 21/4532* (2013.01); *H04N 21/4627* (2013.01)

(56) References Cited

U.S. PATENT DOCUMENTS

| | | | | |
|---|---|---|---|---|
| 2002/0138848 | A1* | 9/2002 | Alao | H04N 7/17309 725/109 |
| 2008/0069087 | A1* | 3/2008 | Igoe | H04N 21/4143 370/352 |
| 2008/0198847 | A1 | 8/2008 | Yamagishi et al. | |
| 2008/0235108 | A1* | 9/2008 | Kulakowski | G06Q 30/00 705/26.8 |
| 2009/0136221 | A1* | 5/2009 | Nakamura | H04N 1/00204 396/1 |
| 2009/0235300 | A1 | 9/2009 | Hayashi | |
| 2009/0293082 | A1* | 11/2009 | Chen | H04N 7/162 725/25 |
| 2010/0007458 | A1* | 1/2010 | Cannistraro | H04L 67/125 340/3.71 |
| 2010/0274816 | A1* | 10/2010 | Guzik | H04N 21/2743 707/802 |
| 2010/0332819 | A1 | 12/2010 | Guionnet et al. | |
| 2011/0030018 | A1 | 2/2011 | Mizuno et al. | |
| 2012/0066321 | A1* | 3/2012 | Perry, II | H04N 21/84 709/206 |
| 2012/0324512 | A1* | 12/2012 | Cahnbley | H04N 21/6175 725/53 |
| 2013/0013689 | A1* | 1/2013 | Crawford | G06Q 30/0259 709/204 |
| 2013/0174242 | A1* | 7/2013 | Snow | H04L 12/4654 726/12 |
| 2013/0198787 | A1* | 8/2013 | Perry, II | H04N 21/4524 725/86 |
| 2014/0074959 | A1 | 3/2014 | Alsina et al. | |
| 2015/0135208 | A1 | 5/2015 | Itagaki | |
| 2016/0226845 | A1* | 8/2016 | Kim | H04L 63/062 |
| 2017/0041835 | A1 | 2/2017 | Takemoto | |
| 2017/0134455 | A1* | 5/2017 | Ballands | G06F 16/434 |
| 2018/0054839 | A1* | 2/2018 | Mizikovsky | H04W 12/06 |
| 2018/0109876 | A1 | 4/2018 | Suyama et al. | |
| 2019/0020922 | A1* | 1/2019 | Sengupta | H04N 21/25841 |
| 2019/0124159 | A1* | 4/2019 | Alsina | H04N 21/2543 |

FOREIGN PATENT DOCUMENTS

| | | |
|---|---|---|
| JP | 2002-185931 A | 6/2002 |
| JP | 2006-270410 A | 10/2006 |
| JP | 2009-219072 A | 9/2009 |
| JP | 2009-278254 A | 11/2009 |
| JP | 2015-43537 A | 3/2015 |
| WO | 2004/051453 A1 | 6/2004 |
| WO | 2009/128492 A1 | 10/2009 |
| WO | 2017/057508 A1 | 4/2017 |
| WO | 2017/073666 A1 | 5/2017 |

* cited by examiner

```
┌─────────────────────────────────────────────┐ ╱-263
│CONNECTION TYPE: STEALTH - DISTRIBUTION TIME PERIOD│
│                      CONDITION SETTING       │
│    ■ UNLIMITED                               │
│    ☐ 12:00AM                                 │
│    ☐ 1:00AM                                  │
│         ⋮                                    │
│    ☐ 10:00PM                                 │
│    ☐ 11:00PM                                 │
│                                              │
└─────────────────────────────────────────────┘
```

*FIG. 8*

CONTENT DISTRIBUTION DEVICE

CROSS-REFERENCE TO RELATED APPLICATIONS

This application claims priority to Japanese Patent Application No. 2018-050980 filed on Mar. 19, 2018. The entire disclosure of Japanese Patent Application No. 2018-050980 is hereby incorporated herein by reference.

BACKGROUND

Field of the Invention

The present invention generally relates to a content distribution device.

Background Information

Content distribution devices are utilized in the field of distribution of content (see, Japanese Patent Application Publication No. 2006-270410 (Patent Literature 1), for example).

Patent Literature 1 discloses a video terminal device, as a content distribution device, that distributes AV data to a television terminal device.

Also, with another content distribution device, it is possible to distribute content to a plurality of distribution terminals. It is also possible with this content distribution device to set a distribution condition for permitting the distribution of content for each distribution terminal, or for prohibiting the distribution of content.

SUMMARY

With the above-mentioned content distribution device, a distribution condition is set for each distribution terminal. Thus, a distribution condition suitable for each distribution terminal can be set. However, it is necessary to set a distribution condition for every distribution terminal. Thus, the user has to take the trouble to set the distribution condition for each distribution terminal. Also, when a distribution condition is set for every distribution terminal, a new distribution condition has to be set for a newly purchased distribution terminal in case that the new distribution terminal is purchased.

One object is to provide a content distribution device with which it is possible to save a trouble to set a distribution related condition for every distribution terminal, or a trouble to set a distribution related condition when a new distribution terminal is purchased, and to apply the distribution related condition suitable for a distribution terminal.

In view of the state of the known technology and in accordance with an aspect of the present invention, a content distribution device comprises a communication component and a controller. The communication component communicates with an access point device having a plurality of identifiers. The controller sets a distribution related condition related to a distribution of content for each of the identifiers. In this disclosure, the distribution related condition related to the distribution of the content is a broad concept that encompasses not only conditions upon distributing content, but also conditions related to content to be distributed.

Also other objects, features, aspects and advantages of the present disclosure will become apparent to those skilled in the field of content distribution devices from the following detailed description, which, taken in conjunction with the annexed drawings, discloses one embodiment of the content distribution device.

BRIEF DESCRIPTION OF THE DRAWINGS

Referring now to the attached drawings which form a part of this original disclosure:

FIG. 8 is a diagram of a screen for setting a distribution time period condition as a distribution related condition in the content distribution device according to the third embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

The configuration of a content distribution system 100 according to a first embodiment will be described through reference to FIGS. 1 to 3.

Figure 1:
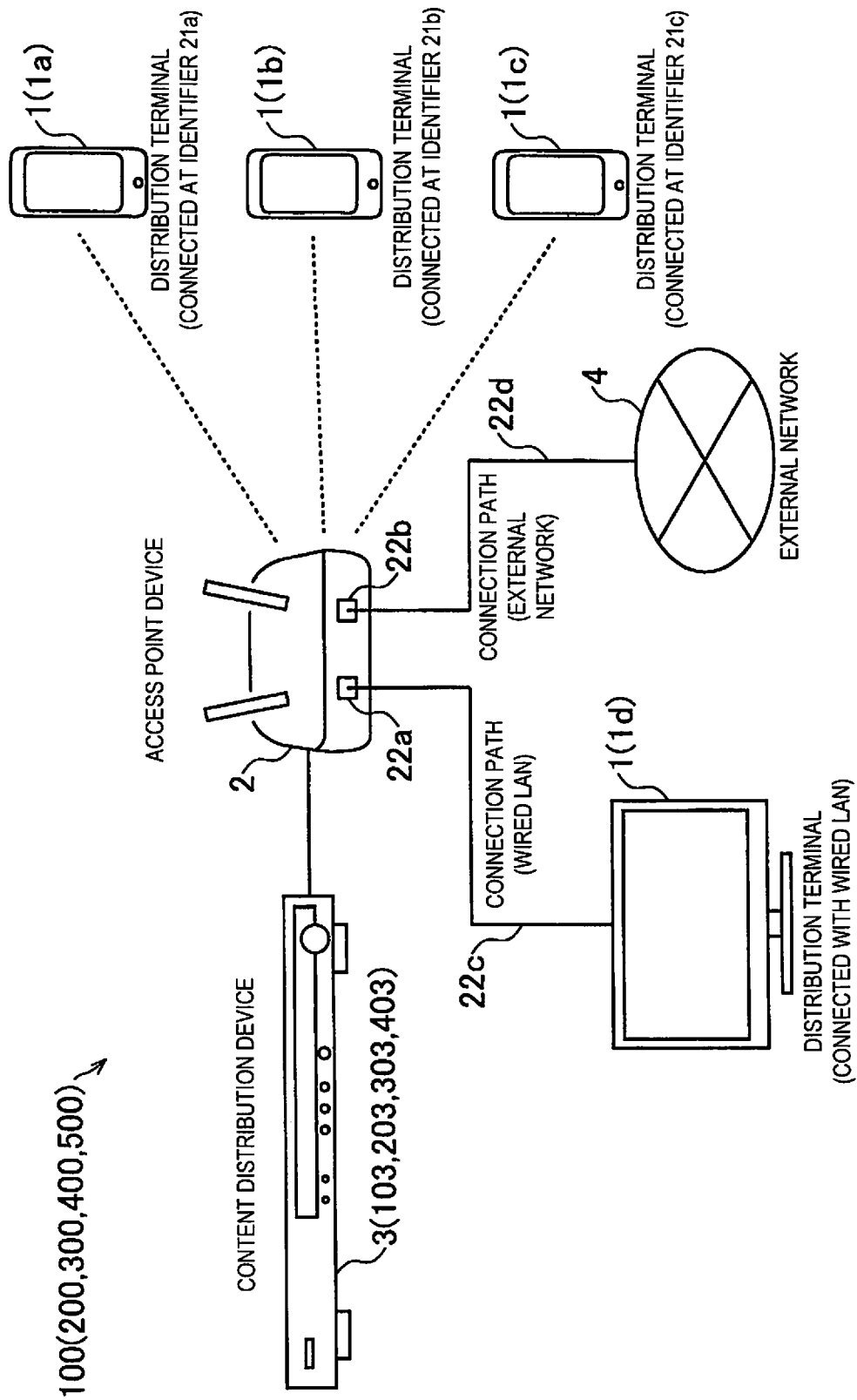
FIG. 1 is a diagram of a content distribution system according to first to fifth embodiments.

As shown in FIG. 1, the content distribution system 100 according to the first embodiment comprises distribution terminals 1, an access point device 2, and a content distribution device 3. The distribution terminals 1, the access point device 2, and the content distribution device 3 are used in a house, for example. In addition, the distribution terminals 1, the access point device 2, and the content distribution device 3 form a home network and are connected to each other so as to be able to communicate with each other through this home network. The distribution terminals 1 and the content distribution device 3 are connected to each other via the access point device 2 so as to be able to communicate with each other. The content distribution system 100 distributes content C from the content distribution device 3 to the distribution terminals 1 via the access point device 2.

The distribution terminals 1 are terminals to which the content C is distributed from the content distribution device 3. The distribution terminals 1 are configured to allow the content C distributed from the content distribution device 3 to be viewed. The distribution terminals 1 (1a to 1c) are, for example, portable terminals such as a smart phone. The distribution terminal 1(1d) is, for example, a television set. The distribution terminals 1 include the distribution terminals 1a to 1c connected to the access point device 2 via a wireless LAN. The distribution terminals 1 also include the distribution terminal 1d connected to the access point device 2 via a wired LAN. The distribution terminals 1 also include a distribution terminal (not shown) connected to the access point device 2 via an external network 4 such as the Internet.

Figure 2:
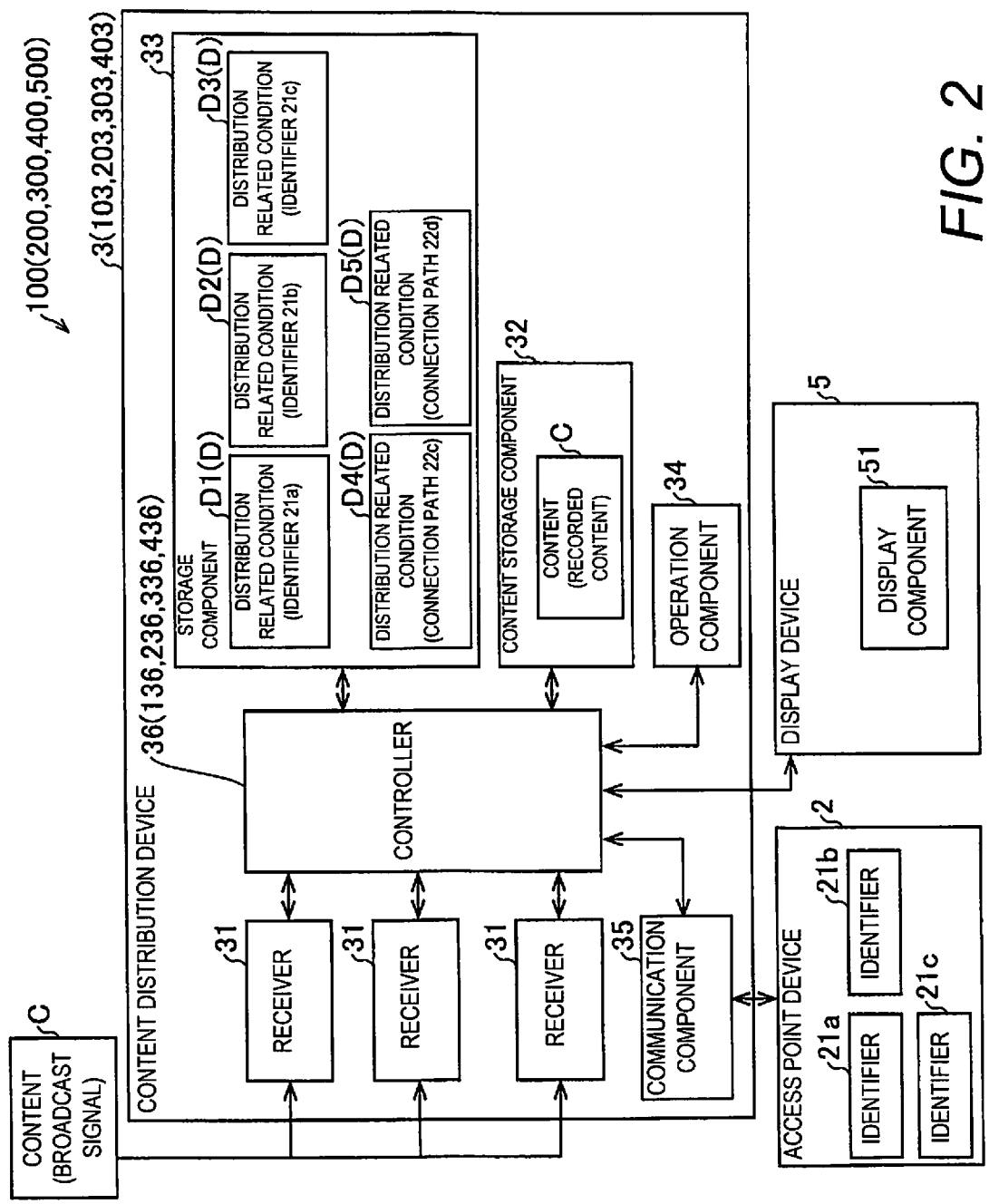
FIG. 2 is a block diagram of a content distribution device, an access point device, and a display device according to the first to fifth embodiments.

As shown in FIGS. 1 and 2, the access point device 2 is a wireless LAN router having a router function. The access point device 2 connects the distribution terminals 1 and the content distribution device 3 such that they can communicate with each other. The access point device 2 has a plurality of (three) identifiers 21a to 21c (SSID (Service Set IDentifier)). The distribution terminals 1 can connect to the access point device 2 via the wireless LAN using one of the identifiers 21a to 21c. In FIG. 1, the distribution terminal 1a uses the identifier 21a, the distribution terminal 1b uses the identifier 21b, and the distribution terminal 1c uses the identifier 21c to connect to the access point device 2 via the wireless LAN. The identifiers 21a to 21c of the distribution terminals 1a to 1c may be stealth identifiers set to stealth. In FIG. 3, the identifier 21a is a stealth identifier.

The access point device 2 includes a plurality of (two) wired LAN connecting components 22a and 22b. The wired LAN connecting components 22a and 22b are ports for wired LAN cables to which wired LAN cables are connected. The distribution terminals 1 can connect to the access point device 2 via a wired LAN using a connection path 22c via the wired LAN connection component 22a or a connection path 22d via the wired LAN connection unit 22b. In FIG. 1, the distribution terminal 1d is connected to the access point device 2 by a wired LAN using the connection path 22c, and the external network 4 is connected to the access point device 2 by a wired LAN using the connection path 22d. The access point device 2 is configured such that it can be connected to the external network 4.

The content distribution device 3 is a device that distributes the content C, including video and audio signals, to the distribution terminals 1. More specifically, the content distribution device 3 is a recorder capable of storing (recording) the content C, and is configured such that it can distribute the stored content C (recorded content) to the distribution terminals 1 via the access point device 2. The content distribution device 3 is also configured to be able to receive the content C as a broadcast signal. The content distribution device 3 is configured to be able to distribute the received content C (content as a broadcast signal) to the distribution terminals 1 in real time.

The content distribution device 3 includes a plurality of (three) receivers 31, a content storage component 32, a storage component 33, an operation component 34, a communication component 35, and an electric controller 36. Each receiver 31 has a tuner and receives a broadcast signal of a selected channel (a frequency band assigned to a broadcasting station). The content storage component 32 is a nonvolatile large-capacity storage medium (storage device or computer memory) such as an HDD (hard disk drive), and stores the content C, such as a broadcast signal received by the receivers 31. The storage component 33 is a nonvolatile storage medium (computer memory) such as a flash memory, and stores information such as a distribution related condition D (discussed below). The operation component 34 includes a remote control, and accepts operations by the user. The communication component 35 (communication module or interface) is connected to the access point device 2 via a wireless LAN or a wired LAN, and communicates with the access point device 2. The controller 36 is a control circuit that controls the operation of the content distribution device 3, and has a processor such as a CPU and a memory. The content distribution device 3 is connected to an externally provided display device 5 via a cable such as an HDMI (registered trademark; High Definition Multimedia Interface) cable or an AV (audio video) cable. The display device 5 is a television set, for example, and includes a display component 51 such as a liquid crystal panel.

Setting of Distribution Related Condition

Figure 3:
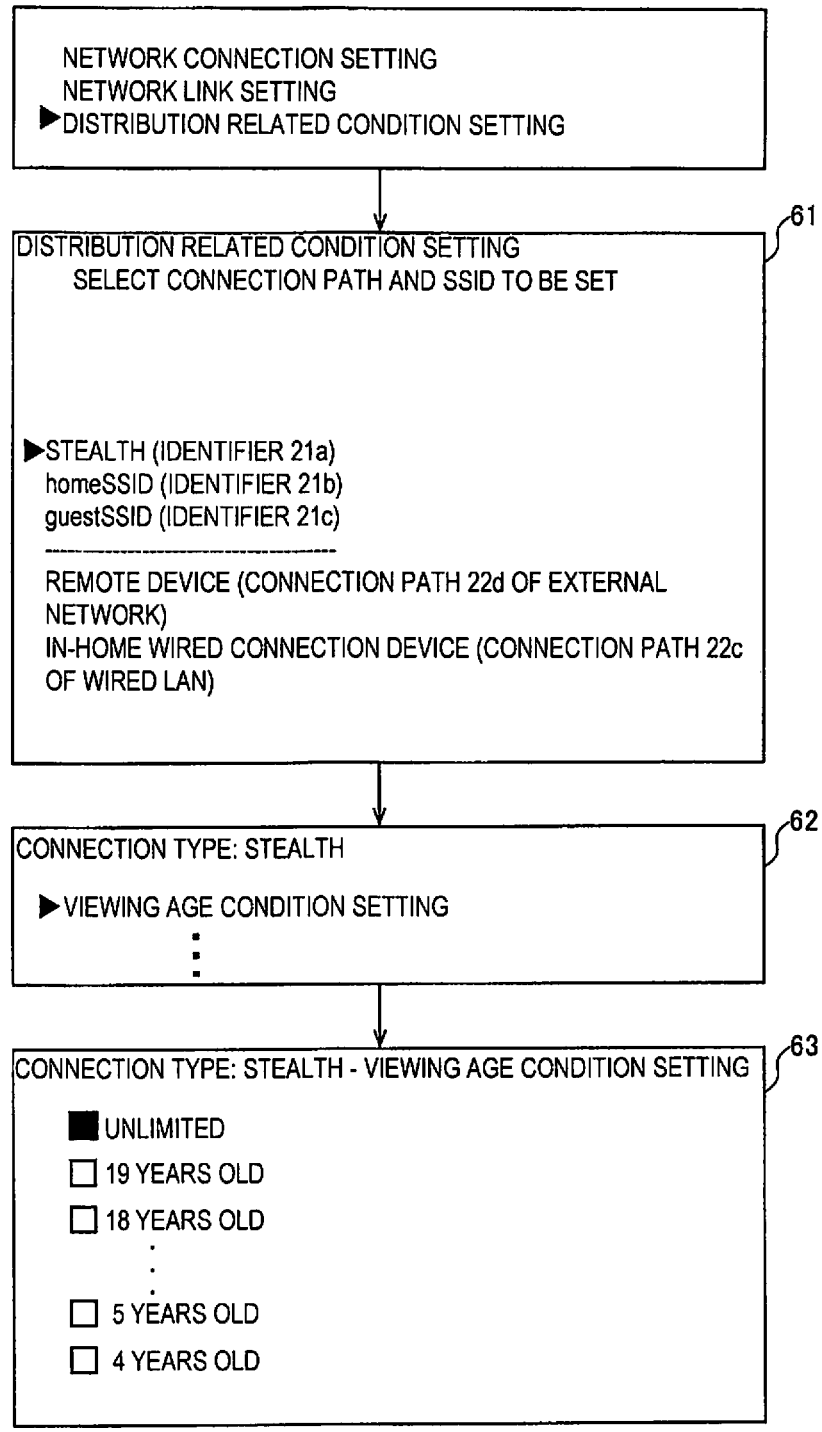
FIG. 3 is a diagram of a screen for setting a distribution related condition in the content distribution device according to the first embodiment.

Here, in the first embodiment, as shown in FIG. 3, the controller 36 is configured such that the distribution related condition D that is related to the distribution of the content C can be set for each of the identifiers 21a to 21c of the access point device 2. The controller 36 controls the display component 51 of the display device 5 to display information such that the distribution related condition D related to the distribution of the content C can be set for each of the identifiers 21a to 21c. The controller 36 is configured such that the distribution related condition D can be set not only for the identifiers 21a to 21c, but also the connection path 22c of the wired LAN and the connection path 22d (the connection path 22d of the external network 4). The controller 36 also controls the display component 51 of the display device 5 to display information such that the distribution related condition D can be set for the connection path 22c of the wired LAN and the connection path 22d (the connection path 22d of the external network 4).

More specifically, the controller 36 controls the display component 51 of the display device 5 to display a setting screen 61 that includes the plurality of (three) identifiers 21a to 21c and the plurality of (two) connecting paths 22c and 22d, so as to be able to select the connecting path or the identifier for which the distribution related condition D is to be set. Also, when an identifier or a connection path is selected on the setting screen 61 with the operation component 34, the controller 36 controls the display component 51 of the display device 5 to display a setting screen 62 for setting the selected identifier or the distribution related condition D. The setting screen 62 is a screen for selecting the type of condition to be set.

When the type of condition to be set is selected on the setting screen 62 with the operation unit 34, the controller 36 controls the display component 51 of the display device 5 to display a setting screen 63 for setting the selected type of condition. In the first embodiment, the distribution related condition D includes a viewing age condition for setting the viewing age. The viewing age condition is a condition for restricting the distribution of the content C according to the viewing age. When the viewing age condition is selected on the setting screen 62 with the operation unit 34, the controller 36 controls the display component 51 of the display device 5 to display the setting screen 63 for setting the viewing age condition. The viewing age condition can be set for each age. Also, the viewing age condition is configured such that it can be set to unlimited.

When the setting of the distribution related condition D of the selected identifier or connection path is complete, the controller 36 performs control to cause the storage component 33 to associate the set identifier or connection path with the distribution related condition D, and store the result. The distribution related condition D includes a distribution related condition D1 associated with the identifier 21a, a distribution related condition D2 associated with the identifier 21b, a distribution related condition D3 associated with the identifier 21c, a distribution condition D4 associated with the connection path 22c, and a distribution related condition D5 associated with the connection path 22d (see FIG. 2).

Also, in the first embodiment, the controller 36 creates a title list of the content C based on the distribution related condition D. More specifically, the controller 36 creates a title list of the content C based on the viewing age condition of the corresponding distribution related condition D (D1 to D5) for each of the identifiers 21a to 21c and the connection paths 22c and 22d. The created title list of the content C includes only the content C that satisfies the set viewing age condition.

Upon receiving a request for a title list of the content C (a title list request) from a specific distribution terminal 1, the controller 36 transmits to the predetermined distribution terminal 1 a title list of the content C corresponding to the identifier or connection path used by the specific distribution terminal 1 (either the identifier 21a, the identifier 21b, the identifier 21c, the connection path 22c, or the connection path 22d). The controller 36 also determines, based on the connection information received from the specific distribution terminal 1, whether the specific distribution terminal 1 is connected to the access point device 2 with the identifier 21a, the identifier 21b, the identifier 21c, the connection path 22c, or the connection path 22d. Also, upon receiving a request from a specific distribution terminal 1 to distribute a specific content C out of the title list, the controller 36 performs control to distribute the requested specific content C to the specific distribution terminal 1.

For example, upon receiving a request for a title list of the content C from the distribution terminal 1a, the controller 36 transmits the title list of the content C corresponding to the identifier 21a used by the distribution terminal 1a to the distribution terminal 1a. That is, upon receiving a request for a title list of the content C from the distribution terminal 1a, the controller 36 transmits the title list of the content C created based on the viewing age condition of the distribution related condition D1 to the distribution terminal 1a. Since the distribution terminals 1b and 1c are the same as the distribution terminal 1a, they will not be described in detail.

Also, upon receiving a request for a title list of the content C from the distribution terminal 1d, for example, the controller 36 sends the distribution terminal 1d a title list of the content C corresponding to the connection path 22c used by the distribution terminal 1d. That is, upon receiving the title list request of the content C from the distribution terminal 1d, the controller 36 sends the distribution terminal 1d the title list of the content C created based on the viewing age condition of the distribution related condition D4.

Also, upon receiving a request for a title list of content C from a distribution terminal (not shown) via the external network 4, for example, the controller 36 sends this distribution terminal a title list of the content C corresponding to the connection path 22d used by this distribution terminal. That is, upon receiving a request for a title list of the content C from this distribution terminal, the controller 36 sends this distribution terminal the title list of the content C created based on the viewing age condition of the distribution related condition D5.

Connection Determination Processing

The connection determination processing by the content distribution device 3 according to the first embodiment will now be described through reference to the flowchart in FIG. 4. The steps of the flowchart are carried out by the controller 36.

Figure 4:
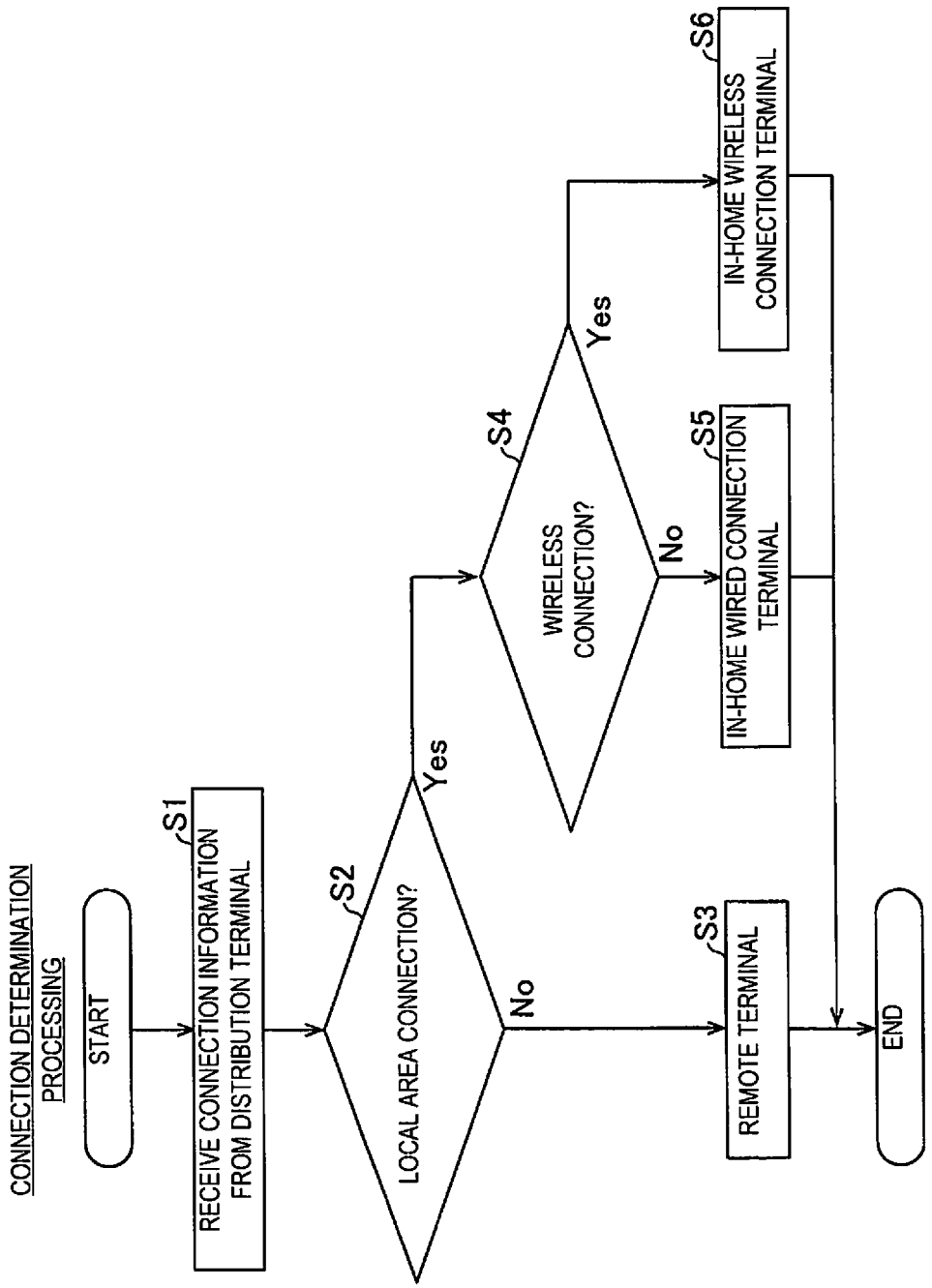
FIG. 4 is a flowchart illustrating connection determination processing by the content distribution device according to the first embodiment.

As shown in FIG. 4, in step S1, connection information from the distribution terminal 1 is received.

In step S2, it is determined whether the connection of the distribution terminal 1 is a local area connection (whether it is a wired LAN connection or a wireless LAN connection), based on the connection information received from the distribution terminal 1. If it is determined that the connection of the distribution terminal 1 is not a local area connection, the flow proceeds to step S3.

Then, in step S3 it is determined that the distribution terminal 1 is a remote, out-of-home or mobile terminal (it is a distribution terminal that uses the connection path 22d of the external network 4). After this, connection determination processing is ended.

If it is determined in step S2 that the connection of the distribution terminal 1 is a local area connection, the flow proceeds to step S4.

Then, in step S4 it is determined whether or not the connection of the distribution terminal 1 is a wireless connection, based on the connection information received from the distribution terminal 1. If it is determined that the connection is not a wireless connection, the flow proceeds to step S5.

Then, in step S5 it is determined that the distribution terminal 1 is an in-home or local wired connection terminal (it is a distribution terminal that uses the wired LAN connection path 22c). After this, the connection determination processing is ended.

If it is determined in step S4 that the connection of distribution terminal 1 is a wireless connection, the flow proceeds to step S6.

Then, in step S6 it is determined that the distribution terminal 1 is an in-home or local wireless connection terminal (it is a distribution terminal that uses one of the identifiers 21a to 21c). In step S6, the identifier used by the distribution terminal 1 (one of the identifiers 21a to 21c) is stored in the storage component 33. After this, the connection determination processing is ended.

Distribution Related Processing

The distribution related processing by the content distribution device 3 according to the first embodiment will now be described through reference to the flowchart in FIG. 5. The steps in the flowchart are carried out by the controller 36.

Figure 5:
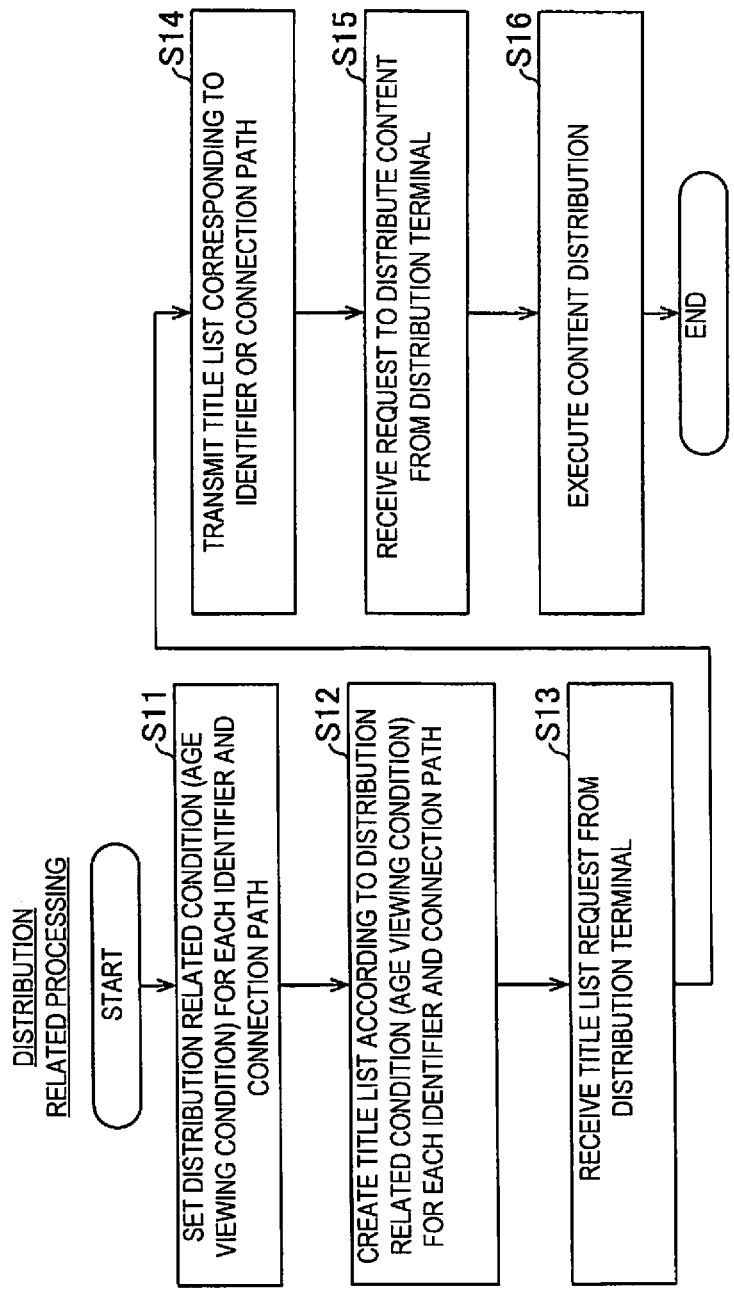
FIG. 5 is a flowchart illustrating distribution related processing by the content distribution device according to the first embodiment.

As shown in FIG. 5, first, in step S11, the viewing age condition of the distribution related condition D is set for each of the identifiers 21a to 21c and the connection paths 22c and 22d.

Then, in step S12, a title list of the content C according to the viewing age condition of the distribution related condition D is created for each of the identifiers 21a to 21c and the connection paths 22c and 22d.

Then, in step S13, a request for a title list of the content C is received from the distribution terminal 1.

Then, in step S14, a title list of the content C corresponding to the identifier or connection path used by the distribution terminal 1 to which the title list request was sent (the identifier 21a, the identifier 21b, the identifier 21c, the connection path 22c, or the connection path 22d) is transmitted to the distribution terminal 1. The transmitted title list of the content C includes only the content C that satisfies the set viewing age condition.

In step S15, a request to distribute specific content C from out of the title list is received from the distribution terminal 1 to which the title list of the content C was transmitted.

Then, in step S16, the specific content C is distributed to the distribution terminal 1 that transmitted the distribution request. After this, the distribution related processing is ended.

Effect of First Embodiment

The following effects can be obtained with the first embodiment.

With the first embodiment, as described above, the controller 36 is configured such that the distribution related condition D related to the distribution of the content C can be set for each of the identifiers 21a to 21c. This makes it possible to set the distribution related condition D for the identifiers 21a to 21c of the access point device 2. Consequently, the distribution related condition D that has been set for the distribution terminal 1 can be applied merely by using the identifier 21a, 21b or 21c for which the distribution related condition D has been set, and connecting the distribution terminal 1 to the access point device 2. As a result, it is unnecessary to set a distribution related condition D for each distribution terminal 1, nor it is necessary to set a distribution related condition D when a new distribution terminal 1 is purchased. Thus, it is possible to save a trouble to set a distribution related condition D for every distribution terminal 1, or a trouble to set a distribution related condition D when a new distribution terminal 1 is purchased. Also, mutually different distribution related conditions D (distribution related conditions D for family, distribution related conditions D for visitors, etc.) can be set for each of the identifiers 21a to 21c of the access point device 2. As a result, if the distribution terminal 1 is connected to the access point device 2 using the proper identifier 21a to 21c, then the distribution related condition D suitable for that distribution terminal 1 (such as a family-use distribution related condition D that is suitable for the distribution terminal 1 of a family) can be applied. As a result, a content distribution device 3 can be provided with which it is possible to save a trouble to set a distribution related condition D for every distribution terminal 1, and a trouble to set a distribution related condition D when a new distribution terminal 1 is purchased, and to apply a distribution related condition D that is suitable for the distribution terminal 1.

Furthermore, with this content distribution device 3 according to the first embodiment, the distribution related condition D can be set for each of the identifiers 21a to 21c of the access point device 2. Thus, the distribution related condition D applied to the distribution terminal 1 can be switched merely by switching the identifiers 21a to 21c to be connected. As a result, when a group such as a family shares the same distribution terminal 1, for example, the distribution related condition D applied to the shared distribution terminal 1 can be switched to the proper distribution related condition D according to the user (such as a parent-oriented distribution related condition D, or a child-oriented distribution related condition D).

Also, with the first embodiment, as described above, the controller 36 is configured to control the display component 51 to display information for setting the distribution related condition D for each of the identifiers 21a to 21c. With this configuration, the user can easily set the distribution related condition D for each of the identifiers 21a to 21c based on the information displayed on the display component 51.

Also, with the first embodiment, as described above, the controller 36 is configured to control the display component 51 to display the identifiers 21a to 21c for selecting an identifier for which the distribution related condition D is set. Consequently, the user can start setting the distribution related condition D for the desired identifier merely by selecting the identifier for which the user wants to set a distribution related condition D, out of the identifiers 21a to 21c displayed on the display component 51. The result is that operation is easier.

Also, with the first embodiment, as described above, the controller 36 is configured to control the display component 51 to display the setting screen 62 for setting the distribution related condition D of the selected identifier. Consequently, the user can easily set the distribution related condition D for the desired identifier according to the setting screen 62 displayed on the display component 51.

Also, with the first embodiment, as described above, the access point device 2 includes the wired LAN connection components 22a and 22b to which the cable of the wired LAN is connected. The controller 36 is configured to set the distribution related condition D for the connection path 22c of the wired LAN via the wired LAN connection component 22a, and the connection path 22d of the wired LAN via the wired LAN connection component 22b. Consequently, the distribution related condition D already set for the distribution terminal 1 can be applied merely by connecting the distribution terminal 1 to the access point device 2 using the connection path 22c or 22d of the wired LAN for which the distribution related condition D is set. As a result, it is possible to save a trouble to set the distribution related condition D for each distribution terminal 1 in regard to a distribution terminal 1 connected using the connection path 22c or 22d of the wired LAN for which the distribution related condition D has been set.

Also, with the first embodiment, as described above, the access point device 2 is configured to be connected to the external network 4. The controller 36 is configured to set the distribution related condition D for the connection path 22d of the external network 4. Consequently, it is possible to apply the distribution related condition D already set to the distribution terminal 1 merely by connecting the distribution terminal 1 to the access point device 2 using the connection path 22d of the external network 4 for which the distribution related condition D has been set. As a result, it is possible to save a trouble to set the distribution related condition D for each distribution terminal 1 in regard to the distribution terminal 1 connected using the connection path 22d of the external network 4 for which the distribution related condition D has been set.

Also, with the first embodiment, as described above, the distribution related condition D includes a viewing age condition for setting the viewing age. Thus, the content C selected based on the set viewing age can be distributed to the distribution terminals 1. As a result, only the content C that is suitable for the user's age can be distributed to the distribution terminals 1. Consequently, only content C suitable for children can be distributed to the distribution terminal 1 used by children, for example.

Also, with the first embodiment, as described above, the viewing age condition is settable for each age. Consequently, the viewing age can be set more precisely. As a result, the content C suitable for the age of the user who uses a distribution terminal 1 can be distributed to that distribution terminal 1.

Also, with the first embodiment, as described above, the controller 36 is configured to create a title list of the content C based on the distribution related condition D. Consequently, the user can confirm the content C to which the distribution related condition D has been applied as a title list on the distribution terminal 1 used by the user. As a result, the user can easily select the content C to be viewed from the title list of the content C to which the distribution related condition D has been applied.

Second Embodiment

A second embodiment will now be described through reference to FIGS. 1 to 3 and FIGS. 6 and 7. In this second embodiment, an example in which the distribution related condition includes a genre condition will be described. Those components that are the same as in the first embodiment are numbered the same in the drawings, and will not be described again.

As shown in FIGS. 1 and 2, the content distribution system 200 of the second embodiment differs from the content distribution system 100 of the first embodiment in that it comprises a content distribution device 103. The content distribution device 103 differs from the content distribution device 3 of the first embodiment in that it comprises a controller 136.

Figure 6:
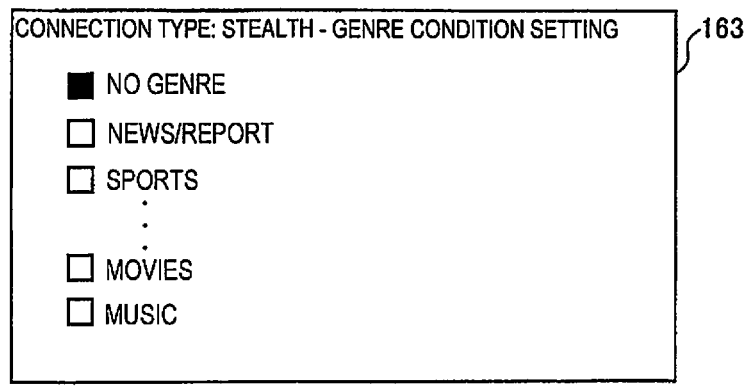
FIG. 6 is a diagram of a screen for setting a genre condition as a distribution related condition in the content distribution device according to the second embodiment.

In the second embodiment, as shown in FIG. 6, the distribution related condition D includes a genre condition (recommended genre condition) for setting a recommended genre. The genre condition is a condition for distributing the content C according to a recommended genre. The controller 136 controls the display component 51 of the display device 5 to display the setting screen 62 (see FIG. 3) such that genre condition can be selected as the type of condition to be set.

When the genre condition has been selected on the setting screen 62 using the operation unit 34, the controller 136 controls the display component 51 of the display device 5 to display a setting screen 163 for setting the genre condition. The genre condition is configured such that it can be set for each genre, such as news/report, sports, movies, music, etc. The genre condition is also configured such that one or more genres can be set. Also, the genre condition is configured such that it is possible to set no genre at all.

Also, in the second embodiment, the controller 136 creates a title list of the content C based on the distribution related condition D. More specifically, the controller 136 creates a title list of the content C based on the genre condition of the corresponding distribution related condition D (D1 to D5) for each of the identifiers 21a to 21c and the connection paths 22c and 22d. The created title list of the content C includes only the content C that satisfies the set genre condition. The transmission of the created title list of the content C to the distribution terminal 1, and the distribution of the content C to the distribution terminal 1 are the same as in the first embodiment, and therefore will not be described in detail again.

Distribution Related Processing

The distribution related processing of the content distribution device 103 according to the second embodiment will now be described through reference to the flowchart in FIG. 7. The steps in the flowchart are carried out by the controller 136.

Figure 7:
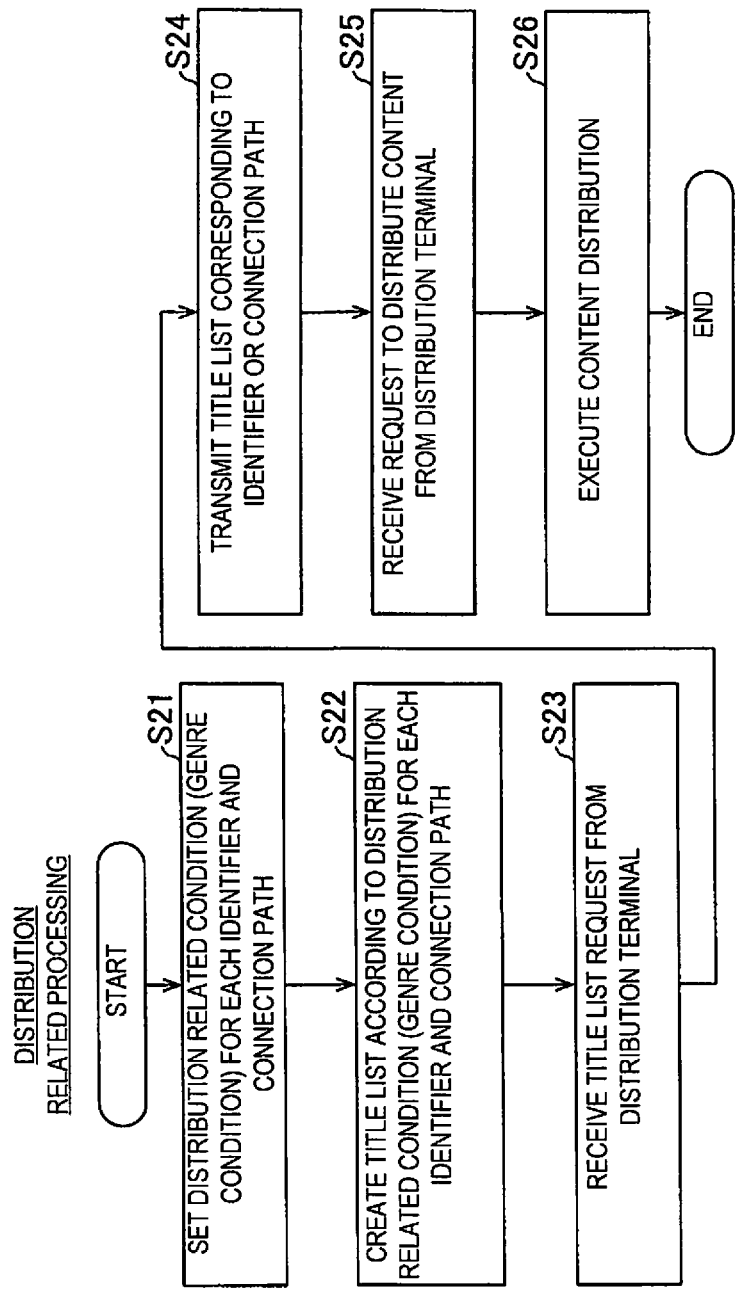
FIG. 7 is a flowchart illustrating distribution related processing by the content distribution device according to the second embodiment.

As shown in FIG. 7, first, in step S21, the genre condition of the distribution related condition D is set for each of the identifiers 21a to 21c and the connection paths 22c and 22d.

Then, in step S22, a title list of the content C that meets the genre condition of the distribution related condition D is created for each of the identifiers 21a to 21c and the connection paths 22c and 22d.

Then, in step S23, the title list request of the content C is received from a distribution terminal 1.

Then, in step S24, a title list of the content C corresponding to the identifier or connection path used by the distribution terminal 1 that transmitted the title list request (either the identifier 21a, the identifier 21b, the identifier 21c, the connection path 22c, or the connection path 22d) is transmitted to the distribution terminal 1. The transmitted title list of the content C includes only the content C that satisfies the set genre condition.

In step S25, a request to distribute the content C specified from the title list is received from the distribution terminal 1 that transmitted the title list of the content C.

Then, in step S26, the specified content C is distributed to the distribution terminal 1 that transmitted the distribution request. After this, the distribution related processing is ended.

The rest of the configuration of the second embodiment is the same as in the first embodiment.

Effect of the Second Embodiment

The following effect can be obtained with the second embodiment.

In the second embodiment, as described above, the distribution related condition D includes a genre condition for setting a genre. The content C selected based on the set genre can be distributed to the distribution terminals 1. As a result, it is possible to distribute only the content C of the genres that the user likes to the distribution terminals 1. This allows the user to easily view preferred content C on the distribution terminal 1 used by the user.

The other effects of the second embodiment are the same as in the first embodiment.

Third Embodiment

A third embodiment will now be described through reference to FIGS. 1 to 3 and FIGS. 8 and 9. In the third embodiment, an example in which the distribution related condition includes a distribution time period condition will be described. Those components that are the same as in the first embodiment are numbered the same in the drawings, and will not be described again.

As shown in FIGS. 1 and 2, the content distribution system 300 of the third embodiment differs from the content distribution system 100 of the first embodiment in that a content distribution device 203 is provided. In addition, the content distribution device 203 differs from the content distribution device 3 of the first embodiment in that it comprises a controller 236.

In the third embodiment, as shown in FIG. 8, the distribution related condition D includes a distribution time period condition for setting a time period in which the distribution of the content C is permitted. The distribution time period condition is a condition for limiting the distribution of the content C according to the time period. The controller 236 controls the display component 51 of the display device 5 to display the setting screen 62 (see FIG. 3) such that the distribution time period condition can be selected as the type of condition to be set.

When the distribution time period condition has been selected on the setting screen 62 using the operation unit 34, the controller 236 controls the display component 51 of the display device 5 to display a setting screen 263 for setting a distribution time period condition. The distribution time period condition is configured such that one or more time periods can be set. The distribution time period condition is also configured such that it can be set hourly. Also, the distribution time period condition is configured such that it can be set to unlimited.

In the third embodiment, upon receiving a request to distribute the content C (a content distribution request) from a specific distribution terminal 1, the controller 236 determines whether or not to permit distribution of the content C to the specified distribution terminal 1 based on the distribution related condition D. More specifically, the controller 236 determines whether or not to permit distribution of the content C to the specified distribution terminal 1 based on the distribution time period condition of the distribution related condition D corresponding to the identifier or connection path used by the specified distribution terminal 1 (either the identifier 21a, the identifier 21b, the identifier 21c, the connection path 22c, or the connection path 22d).

Upon determining that the current time period is a permitted time period, the controller 236 permits the distribution of the content C to the specified distribution terminal 1. When permitting the distribution of the content C, the controller 236 performs control to distribute the content C to the specified distribution terminal 1. Also, upon determining that the current time period is not a permitted time period (that it is a prohibited time period), the control portion 236 refuses distribution of the content C to the specified distribution terminal 1. When the distribution of the content C is refused, the controller 236 performs control to notify the specified distribution terminal 1 that the content C cannot be distributed.

For instance, upon receiving a request to distribute the content C from the distribution terminal 1a, the controller 236 determines whether or not to permit the distribution of the content C to the distribution terminal 1a based on the distribution time period condition of the distribution related condition D1 corresponding to the identifier 21a used by the distribution terminal 1a. Since the distribution terminals 1b and 1c are the same as the distribution terminal 1a, they will not be described in detail.

Also, upon receiving a request to distribute the content C from the distribution terminal 1d, for example, the controller 236 determines whether or not to permit the distribution of the content C to the distribution terminal 1d based on the distribution time period condition of the distribution related condition D4 corresponding to the connection path 22c used by the distribution terminal 1d.

Also, upon receiving a request to distribute the content C from a distribution terminal (not shown) via the external network 4, for example, the controller 236 determines whether or not to permit the distribution of the content C to this distribution terminal based on the distribution time period condition of the distribution related condition D5 corresponding to the connection path 22d used by this distribution terminal.

Distribution Related Processing

Next, referring to FIG. 9, the distribution related processing of the content distribution device 203 according to the third embodiment will now be described based on a flowchart. The steps in the flowchart are carried out by the controller 236.

Figure 9:
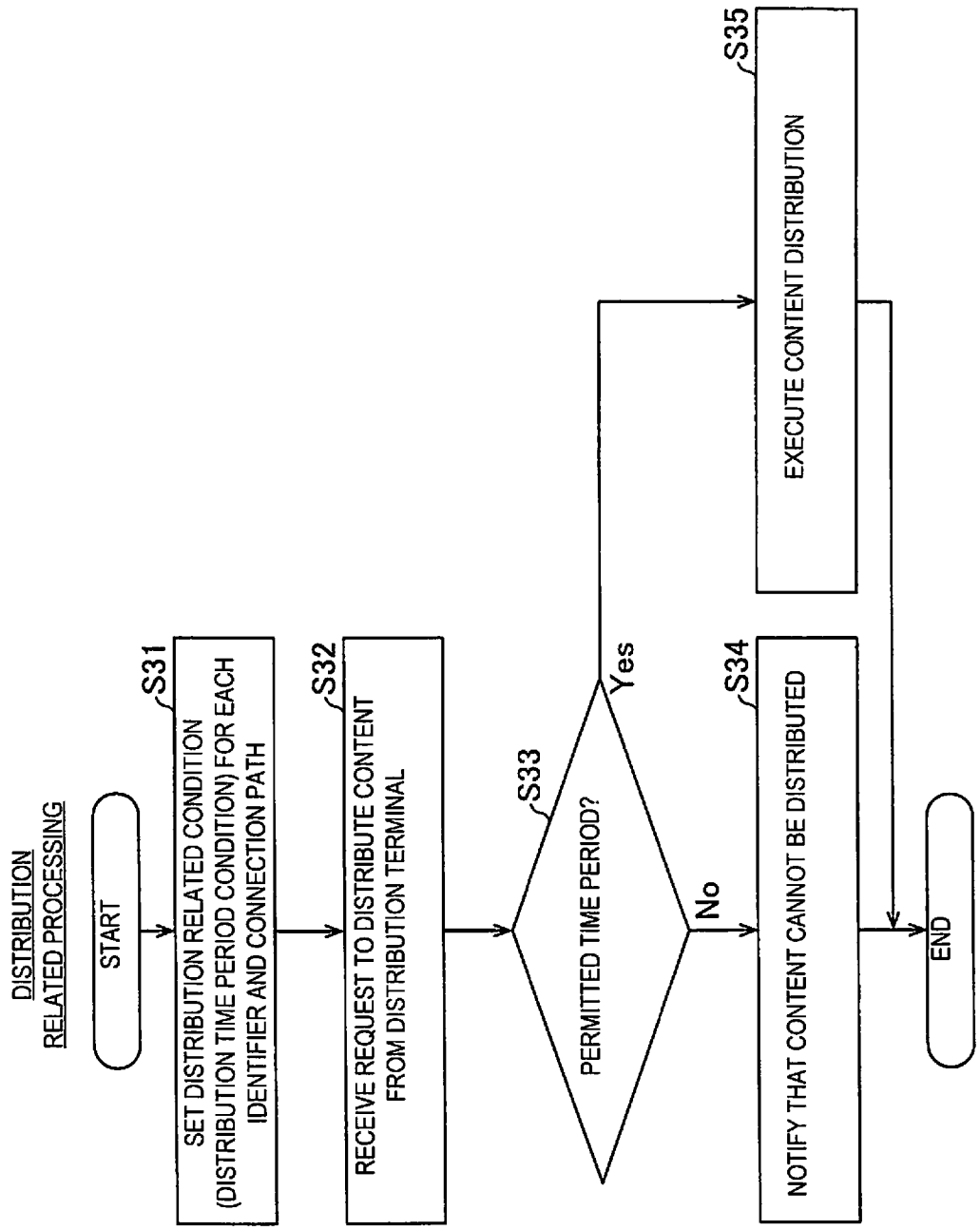
FIG. 9 is a flowchart illustrating distribution related processing by the content distribution device according to the third embodiment.

As shown in FIG. 9, first, in step S31 the distribution time period condition of the distribution related condition D is set for each of the identifiers 21a to 21c and the connection paths 22c and 22d.

Then, in step S32 a request to distribute the specific content C is received from the distribution terminal 1.

Then, in step S33 it is determined whether or not the current time period is a time period in which the distribution of the content C is permitted, based on the distribution time period condition of the distribution related condition D corresponding to the identifier or connection path used by the distribution terminal 1 that transmitted the distribution request (either the identifier 21a, the identifier 21b, the identifier 21c, the connection path 22c, or the connection path 22d). If it is determined that the current time period is not a time period in which the distribution of content C is permitted, the flow proceeds to step S34.

Then, in step S34 the distribution terminal 1 that transmitted the distribution request is notified that the content C cannot be distributed.

If it is determined in step S33 that the current time period is a time period in which the distribution of content C is permitted, the flow proceeds to step S35.

Then, in step S35 distribution of the specified content C to the distribution terminal 1 that transmitted the distribution request is executed. After this, the distribution related processing is ended.

The rest of the configuration of the third embodiment is the same as in the first embodiment.

Effect of Third Embodiment

The following effect can be obtained in the third embodiment.

With the third embodiment, as described above, the distribution related condition D includes a distribution time period condition for setting a time period in which the distribution of the content C is permitted. Consequently, the content C can be distributed to the distribution terminal 1 during the time period in which it is desired to distribute the content C, while restricting the distribution of the content C to the distribution terminal 1 during the time period in which it is not desired to distribute the content C. As a result, the distribution of nighttime content to a distribution terminal 1 used by a child, for example, can be restricted so the child will not stay up too late, and in the daytime content can be distributed to the distribution terminal 1 used by the child such that the content can be viewed.

In addition, with the third embodiment, as described above, the controller 236 is configured to determine whether or not the distribution of the content C is permitted based on the distribution related condition D. Consequently, it is possible to restrict the distribution of the content C to distribution terminals 1 for which the distribution of the content C is not desired. Also, it is possible to distribute the content C to the distribution terminals 1 to which the distribution of the content C is desired.

In the third embodiment, as described above, the controller 236 is configured to perform control to distribute the content C when the distribution of the content C is permitted, and configured to perform control to notify that the content C cannot be distributed when the distribution of the content C is refused. Consequently, when the distribution of the content C is permitted, the content C can be distributed reliably and quickly to the distribution terminals 1. Also, when the distribution of the content C is refused, the user can be notified via the distribution terminal 1 that the content C cannot be distributed. As a result, the user can ascertain that the content C is not being distributed to the distribution terminal 1 used by the user due to the setting, rather than the content C not being distributed to the distribution terminal 1 used by the user due to some kind of problem.

The other effects of the third embodiment are the same as those of the first embodiment.

Fourth Embodiment

Next, a fourth embodiment will be described through reference to FIGS. 1 to 3 and FIGS. 10 and 11. In this fourth embodiment, an example in which the distribution related condition includes a channel condition will be described. Those components that are the same as in the first embodiment are numbered the same in the drawings, and will not be described again.

As shown in FIGS. 1 and 2, the content distribution system 400 of the fourth embodiment differs from the content distribution system 100 of the first embodiment in that a content distribution device 303 is provided. The content distribution device 303 differs from the content distribution device 3 of the first embodiment in that it comprises a controller 336.

Figure 10:
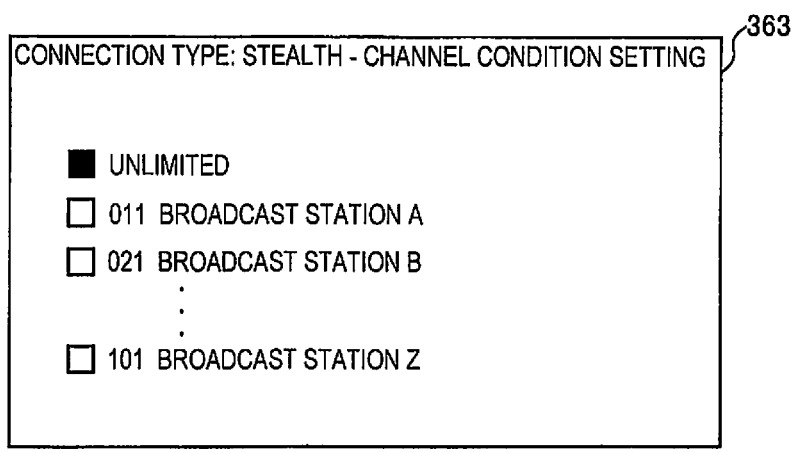
FIG. 10 is a diagram of a screen for setting a channel condition as a distribution related condition in the content distribution device according to the fourth embodiment.

In the fourth embodiment, as shown in FIG. 10, the distribution related condition D includes a channel condition (live viewing channel condition) for setting a channel for which real-time distribution of the content C (a broadcast signal) is permitted. The channel condition is a condition for limiting the real-time distribution of the content C as a broadcast signal to channels. The controller 336 controls the display component 51 of the display device 5 to display the setting screen 62 (see FIG. 3) such that the channel condition can be selected as the type of condition to be set.

When the channel condition is selected on the setting screen 62 with the operation component 34, the controller 336 controls the display component 51 of the display device 5 to display a setting screen 363 for setting the channel condition. The channel condition can be set for each channel. Also, the channel condition is configured such that one or more channels can be set. The channel condition is also configured such that it can be set to unlimited.

In the fourth embodiment, upon receiving a request to distribute the content C from a specific distribution terminal 1, the controller 336 determines whether or not to permit distribution of the content C to a specific distribution terminal 1 based on the distribution related condition D. More specifically, the controller 336 determines whether or not distribution of the content C to a specific distribution terminal 1 is permitted based on the channel condition of the distribution related condition D corresponding to the identifier or connection path used by the specific distribution terminal 1 (either the identifier 21a, the identifier 21b, the identifier 21c, the connection path 22c, or the connection path 22d). The determination of whether to permit distribution of the content C to the specified distribution terminal 1, and the operations following this determination of permission or refusal are the same as those in the third embodiment, and therefore will not be described again in detail.

Distribution Related Processing

The distribution related processing of the content distribution device 303 according to the fourth embodiment will now be described based on the flowchart in FIG. 11. The steps in the flowchart are carried out by the controller 336.

Figure 11:
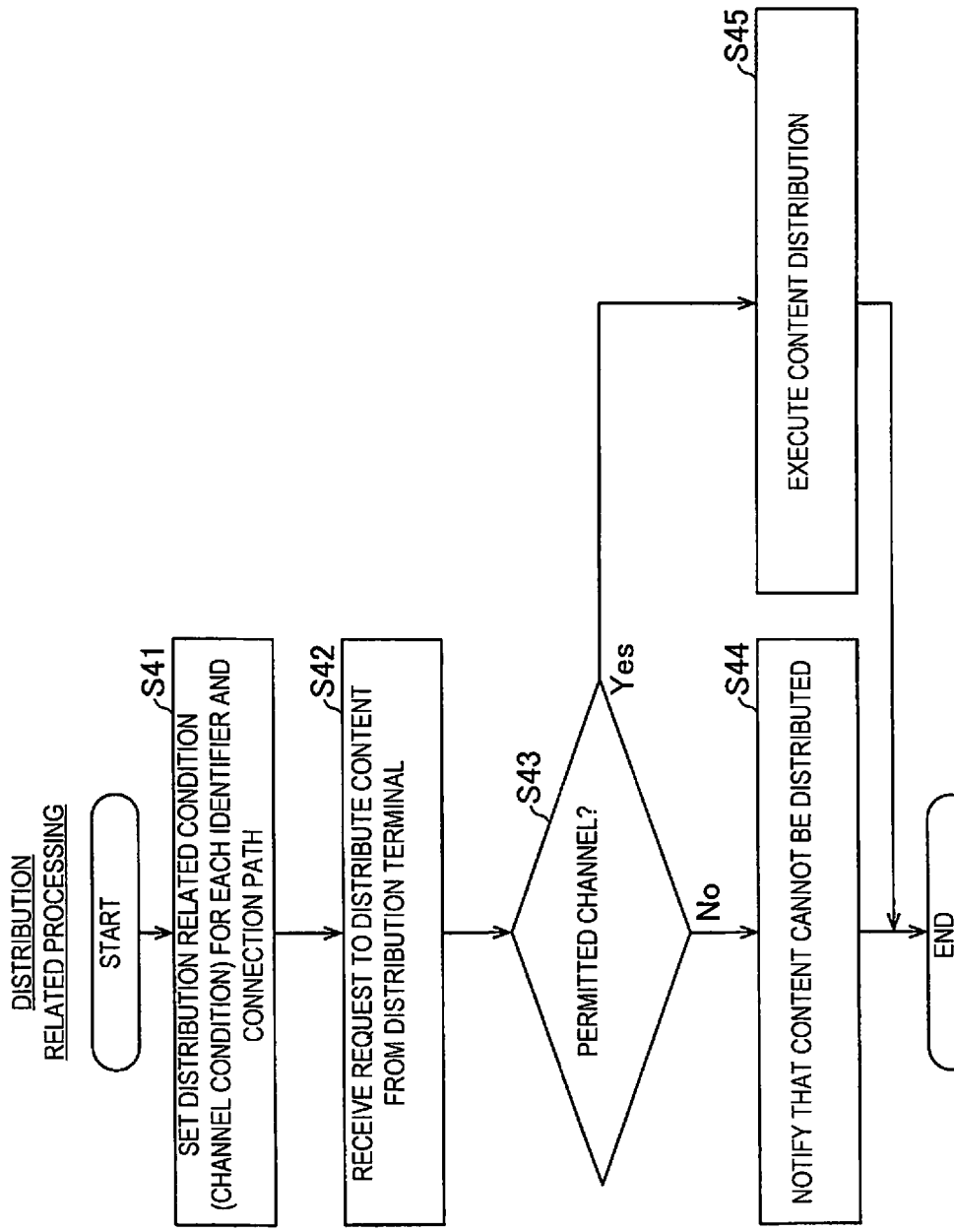
FIG. 11 is a flowchart illustrating distribution related processing by the content distribution device according to the fourth embodiment.

As shown in FIG. 11, first, in step S41 the channel condition of the distribution related condition D is set for each of the identifiers 21a to 21c and the connection paths 22c and 22d.

Then, in step S42 a request to distribute specific content C is received from a distribution terminal 1.

Then, in step S43 it is determined whether or not the channel of the requested content C is a channel permitted to be distributed, based on the channel condition of the distribution related condition D corresponding to the identifier or connection path used by the distribution terminal 1 that transmitted the distribution request (either the identifier 21a, the identifier 21b, the identifier 21c, the connection path 22c, or the connection path 22d). If it is determined that the channel of the requested content C is not a channel permitted to be distributed, the flow proceeds to step S44.

In step S44, the distribution terminal 1 that transmitted the distribution request is notified that the content C cannot be distributed.

If it is determined in step S43 that the channel of the requested content C is a channel permitted to be distributed, the flow proceeds to step S45.

Then, in step S45 distribution of the specific content C to the distribution terminal 1 that transmitted the distribution request is executed. After this, the distribution related processing is ended.

The rest of the configuration of the fourth embodiment is the same as in the first embodiment.

Effect of Fourth Embodiment

The following effect can be obtained with the fourth embodiment.

In the fourth embodiment, as described above, the content distribution device 303 further comprises the receiver 31 configured to receive the broadcast signal of the selected channel. The distribution related condition D includes the channel condition for setting the channels whose distribution is permitted. Consequently, it is possible to restrict the distribution of the content C of the channels not desired to be distributed to the distribution terminals 1. As a result, just the content C of the channels preferred by the user can be distributed to the distribution terminals 1. This allows the user to easily view to the content C of his favorite channels on the distribution terminal 1 used by the user.

The other effects of the fourth embodiment are the same as in the first embodiment.

Fifth Embodiment

A fifth embodiment will now be described through reference to FIGS. 1 to 3 and FIGS. 12 and 13. In the fifth embodiment, an example in which the distribution related condition includes an operation condition will be described.

Those components that are the same as in the first embodiment are numbered the same in the drawings, and will not be described again.

As shown in FIGS. 1 and 2, the content distribution system 500 of the fifth embodiment differs from the content distribution system 100 of the first embodiment in that it comprises a content distribution device 403. The content distribution device 403 differs from the content distribution device 3 of the first embodiment in that it comprises a controller 436.

Figure 12:
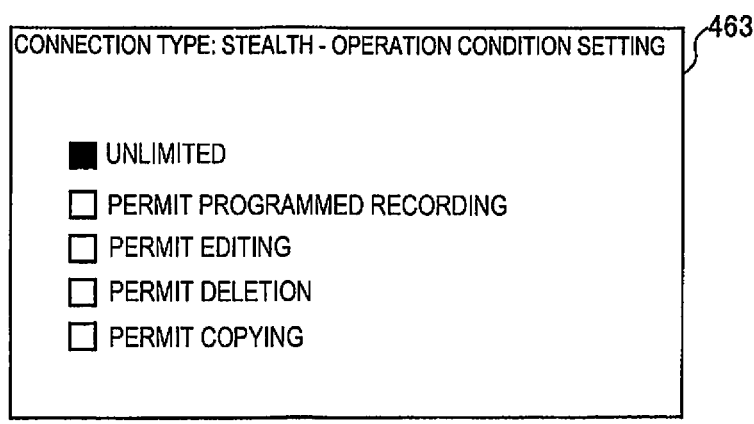
FIG. 12 is a diagram of a screen for setting an operation condition as a distribution related condition in the content distribution device according to the fifth embodiment.

In the fifth embodiment, as shown in FIG. 12, the distribution related condition D includes an operation condition for setting an operation related to permitted content C. The operation condition is a condition for restricting the operation of the content C on the distribution terminals 1. The controller 436 controls the display component 51 of the display device 5 to display the setting screen 62 (see FIG. 3) such that the operation condition can be selected as the type of condition to be set.

When an operation condition is selected on the setting screen 62 with the operation unit 34, the controller 436 controls the display component 51 of the display device 5 to display a setting screen 463 for setting an operation condition. The operation condition is configured such that it can be set for each operation. Operations that can be set include programmed recording (scheduled recording), deletion of content C, editing of content C, and copying of content C. The operation condition is also configured such that it can be set to unlimited.

In the fifth embodiment, upon receiving an operation request related to the content C (a content operation request) from a specific distribution terminal 1, the controller 436 determines whether or not to permit the operation related to the content C on the specific distribution terminal 1 based on the distribution related condition D. More specifically, the controller 436 determines whether or not to permit the operation related to the content C on the specific distribution terminal 1 based on the operation condition of the distribution related condition D corresponding to the identifier or connection path used by the specific distribution terminal 1 (either the identifier 21a, the identifier 21b, the identifier 21c, the connection path 22c, or the connection path 22d).

When it is determined that the operation requested by a specific distribution terminal 1 is a permitted operation, the controller 436 permits the operation related to the content C on the specific distribution terminal 1. If the operation related to the content C is permitted, the controller 436 performs control to execute the permitted operation (programmed recording, editing, deletion, copying, etc.). If it is determined that the operation requested by the specific distribution terminal 1 is not a permitted operation (is a prohibited operation), the controller 436 refuses the operation related to the content C on the specific distribution terminal 1. When an operation related to the content C is refused, the controller 436 performs control to notify the specific distribution terminal 1 that the operation related to the content C cannot be executed.

For example, upon receiving an operation request related to the content C from the distribution terminal 1a, the controller 436 determines whether or not to permit the operation related to the content C by the distribution terminal 1a based on the operation condition of the distribution related condition D1 corresponding to the identifier 21a used by the distribution terminal 1a. The distribution terminals 1b and 1c are the same as the distribution terminal 1a, and therefore will not be described again in detail.

Also, upon receiving an operation request related to the content C from the distribution terminal 1d, for example, the controller 436 determines whether or not to permit the operation related to the content C by the distribution terminal 1d based on the operation condition of the distribution related condition D4 corresponding to the connection path 22c used by the distribution terminal 1d.

Also, upon receiving an operation request related to the content C from a distribution terminal via the external network 4 (not shown), for example, the controller 436 determines whether or not to permit the operation related to the content C by this distribution terminal based on the operation condition of the distribution related condition D5 corresponding to the connection path 22d used by this distribution terminal.

Distribution Related Processing

The distribution related processing of the content distribution device 403 according to the fifth embodiment will now be described based on the flowchart in FIG. 13. The steps in the flowchart are carried out by the controller 436.

Figure 13:
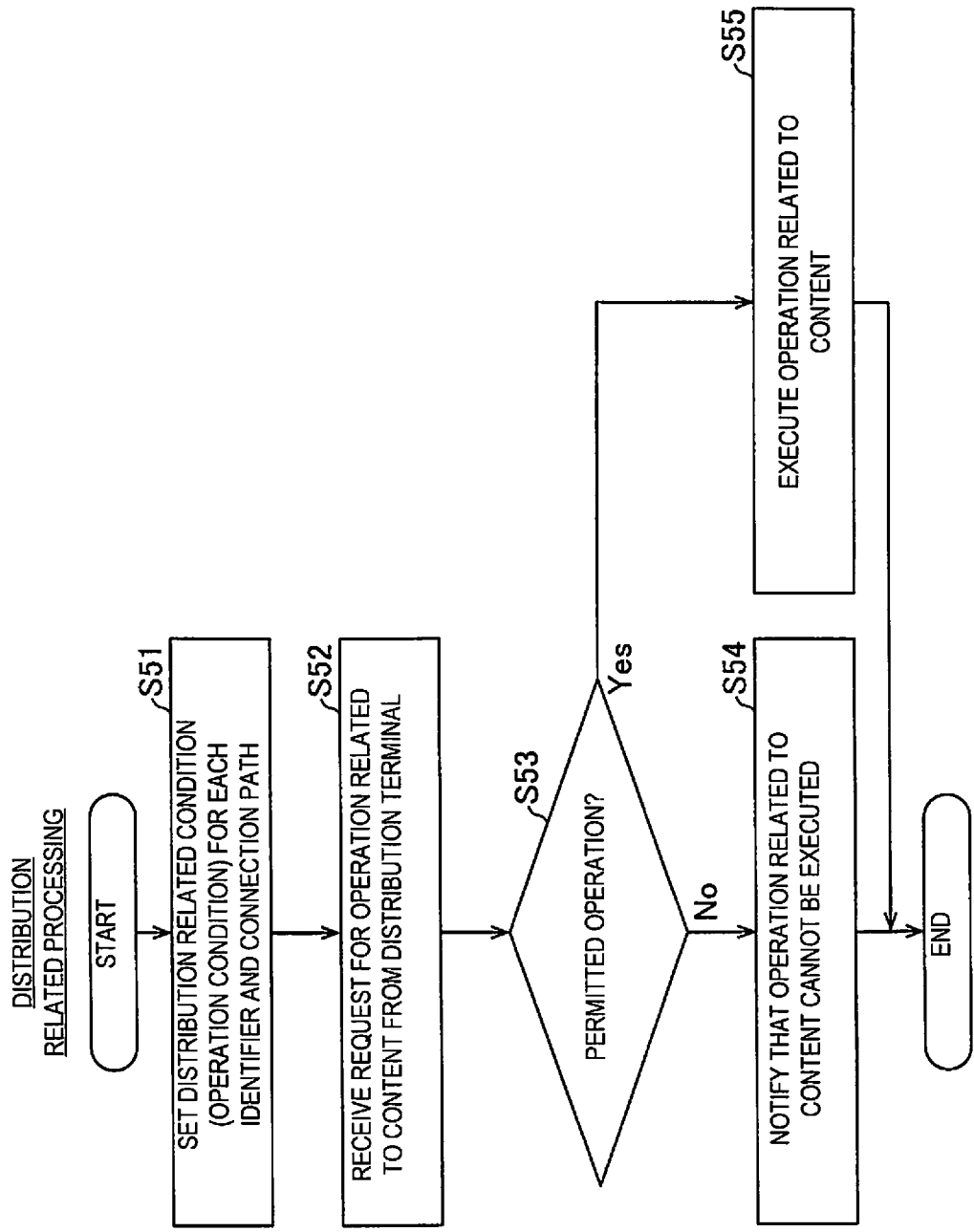
FIG. 13 is a flowchart illustrating distribution related processing by the content distribution device according to the fifth embodiment.

As shown in FIG. 13, first, in step S51 the operation condition of the distribution related condition D is set for each of the identifiers 21a to 21c and the connection paths 22c and 22d.

Then, in step S52 an operation request for a specific operation related to the content C (programmed recording, editing, deletion, copying, etc.) is received from a distribution terminal 1.

Then, in step S53 it is determined whether or not the requested operation is a permitted operation based on the operation condition of the distribution related condition D corresponding to the identifier or connection path used by the distribution terminal 1 that transmitted the operation request (either the identifier 21a, the identifier 21b, the identifier 21c, the connection path 22c, or the connection path 22d). If it is determined that the requested operation is not a permitted operation, the flow proceeds to step S54.

In step S54 the distribution terminal 1 that transmitted the operation request is notified that the operation related to the content C cannot be executed.

Also, if it is determined in step S53 that the requested operation is a permitted operation, the flow proceeds to step S55.

Then, in step S55 a specific operation related to the content C on the distribution terminal 1 that transmitted the operation request is executed. After this, the distribution related processing is ended.

The rest of the configuration of the fifth embodiment is the same as that of the first embodiment.

Effect of Fifth Embodiment

The following effect can be obtained in the fifth embodiment.

In the fifth embodiment, as described above, the distribution related condition D includes the operation condition for setting the permitted operations related to the content C. This makes it possible to restrict operations related to the content C from being performed using a distribution terminal 1 by which operations related to the content C are not desired. As a result, it is possible to restrict undesired operations from being performed using a distribution terminal 1 used by a child or visitors, for example.

Also, in the fifth embodiment, as described above, the permitted operations related to the content C include programmed recording, deletion, editing, and copying. This makes it possible to restrict programmed recording, deletion, editing, or copying from being performed by a distribution terminal 1 by which an operation related to the content C is not desired.

The other effects of the fifth embodiment are the same as in the first embodiment.

Modification Examples

The embodiments disclosed herein are examples in all respects, and should not be thought of as limiting in nature. The scope of the invention being indicated by the appended claims rather than by the above description of the embodiments, all modifications (modification examples) within the meaning and range of equivalency of the claims are included.

For instance, in the first to fifth embodiments, the content distribution device is constituted by a recorder, but this is not the only option. In the present invention, as long as content can be distributed, the content distribution device may be constituted by something other than a recorder. For example, the content distribution device may be constituted by an STB (set top box) that can receive content as a broadcast signal and distribute this content.

In the first to fifth embodiments, the content distribution device is configured such that information for setting the distribution related condition is displayed on the display component of an externally provided display device, but the present invention is not limited to this. In the present invention, if the content distribution device comprises a display component, the content distribution device may be configured such that information for setting the distribution related condition is displayed on the device's own display component.

In the first to fifth embodiments, the content distribution device is configured such that the distribution related condition can be set not only for an identifier, but also for the connection path of a wired LAN and the connection path of an external network, but the present invention is not limited to this. With to the present invention, as long as the content distribution device is configured such that the distribution related condition can be set for each identifier, the content distribution device need not be configured such that the distribution related condition can be set for the connection path of a wired LAN and the connection path of an external network.

In the first to fifth embodiments described above, the content distribution device is configured to comprise three receivers, but the present invention is not limited to this. With the present invention, the content distribution device may be configured to comprise one receiver, or a plurality of receivers other than three. Also, the content distribution device need not be configured to comprise a receiver.

Also, in the first to fifth embodiments, an example is given in which the content is constituted by recorded content and content received as a broadcast signal, but the present invention is not limited to this. With the present invention, the content may be constituted by something other than recorded content or content received as a broadcast signal.

In the first to fifth embodiments, the distribution related condition is configured to include a viewing age restriction, a genre condition, a distribution time period condition, a channel condition, or an operation condition, respectively, but the present invention is not limited to this. With the present invention, the distribution related condition may be configured to include two or more of a viewing age restriction, a genre condition, a distribution time period condition, a channel condition, and an operation condition. Also, the distribution related condition may be configured to include something other than a viewing age restriction, a genre condition, a distribution time period condition, a channel condition, or an operation condition.

In the first to fifth embodiments, an example is given in which the access point device is configured to have three identifiers, but the present invention is not limited to this. With the present invention, the access point device may be configured to have a plurality of identifiers other than three.

In the first to fifth embodiments, an example is given in which the access point device is configured to include two wired LAN connection components, but the present invention is not limited to this. With the present invention, the access point device may be configured to include a single wired LAN connection component, or a plurality of them other than two. Also, the access point device need not be configured to include a wired LAN connection component.

In the first to fifth embodiments, an example is given in which the access point device is connected to an external network by a wired LAN, but the present invention is not limited to this. For example, the access point device may be connected to an external network by a wireless LAN. Also, the access point device need not be configured to be connectable to an external network.

In the first to fifth embodiments, an example is given in which the access point device is constituted by a wireless LAN router having a router function, but the present invention is not limited to this. For example, the access point device may be constituted by a wireless device having only an access point function.

Also, in the fifth embodiment, an example is given in which operations related to content include programmed recording, deletion, editing, and copying, but the present invention is not limited to this. With the present invention, operations related to content may include at least one of programmed recording, deletion, editing, and copying. In addition, operations related to content may include something other than programmed recording, deletion, editing, and copying.

Also, in the first to fifth embodiments, for the sake of description, the processing operation is described using a flow driven type of flowchart in which the processing is performed sequentially along the processing flow, but the present invention is not limited to this. With the present invention, the processing operation may be performed by an event driven type of processing in which processing is executed on an event basis. In this case, it may be performed in a completely event driven manner, or a combination of event driven and flow driven may be used.

[1] In view of the state of the known technology and in accordance with an aspect of the present invention, a content distribution device comprises a communication component and a controller. The communication component is configured to communicate with an access point device having a plurality of identifiers. The controller is configured to set a distribution related condition related to a distribution of content for each of the identifiers. In this disclosure, the distribution related condition related to the distribution of the content is a broad concept that encompasses not only conditions upon distributing content, but also conditions related to content to be distributed.

With this content distribution device, the above-mentioned configuration allows the distribution related condition to be set for the identifiers of the access point device. Consequently, the distribution related condition that has been set for a distribution terminal can be applied merely by using the identifier for which the distribution related condition has been set, and connecting the distribution terminal to the access point device. As a result, it is unnecessary to set a distribution related condition for each distribution terminal, nor it is necessary to set a distribution related condition when a new distribution terminal is purchased. Thus, it is possible to save a trouble to set a distribution related condition for every distribution terminal, or a trouble to set a distribution related condition when a new distribution terminal is purchased. Also, mutually different distribution related conditions (distribution related conditions for family, distribution related conditions for visitors, etc.) can be set for each identifier of the access point device. As a result, if the distribution terminal is connected to the access point device using the proper identifier, then the distribution related condition suitable for the distribution terminal (such as a family-use distribution related condition that is suitable for the distribution terminal of a family) can be applied. As a result, a content distribution device can be provided with which it is possible to save a trouble to set a distribution related condition for every distribution terminal, and a trouble to set a distribution related condition when a new distribution terminal is purchased, and to apply a distribution related condition that is suitable for the distribution terminal.

Furthermore, with this content distribution device, the distribution related condition can be set for each identifier of the access point device. Thus, the distribution related condition can be switched simply by switching the identifier to be connected. As a result, when a group such as a family shares the same distribution terminal, for example, the distribution related condition applied to the shared distribution terminal can be switched to the proper distribution related condition according to the user (such as a parent-oriented distribution related condition, or a child-oriented distribution related condition).

[2] In accordance with a preferred embodiment according to the content distribution device mentioned above, the controller is configured to control a display component to display information for setting the distribution related condition for each of the identifiers. With this configuration, the user can easily set the distribution related condition for each identifier based on the information displayed on the display component.

[3] In accordance with a preferred embodiment according to any one of the content distribution devices mentioned above, the controller is configured to control the display component to display the identifiers for selecting an identifier for which the distribution related condition is set. With this configuration, the user can start setting the distribution related condition for the desired identifier merely by selecting the identifier for which the user wants to set a distribution related condition, out of the plurality of identifiers displayed on the display component. The result is that operation is easier.

[4] In accordance with a preferred embodiment according to any one of the content distribution devices mentioned above, in a configuration in which the identifiers are displayed on the display component such that for selecting the identifier for which the distribution related condition is set, the controller is configured to control the display component to display a setting screen for setting the distribution related condition of the selected identifier. With this configuration, the user can easily set the distribution related condition for the desired identifier according to the setting screen displayed on the display component.

[5] In accordance with a preferred embodiment according to any one of the content distribution devices mentioned above, the access point device includes a wired LAN connection component to which a cable of a wired LAN is connected. The controller is configured to set the distribution related condition for a connection path of the wired LAN via the wired LAN connection component. With this configuration, the distribution related condition already set for a distribution terminal can be applied merely by connecting the distribution terminal to the access point device using the connection path of the wired LAN for which the distribution related condition is set. As a result, it is possible to save a trouble to set a distribution related condition for each distribution terminal in regard to a distribution terminal connected using the connection path of the wired LAN for which the distribution related condition has been set.

[6] In accordance with a preferred embodiment according to any one of the content distribution devices mentioned above, the access point device is configured to be connected to an external network. The controller is configured to set the distribution related condition for a connection path of the external network. With this configuration, it is possible to apply the distribution related condition already set to the distribution terminal merely by connecting the distribution terminal to the access point device using the connection path of the external network for which the distribution related condition has been set. As a result, it is possible to save a trouble to set a distribution related condition for each distribution terminal in regard to a distribution terminal connected using the connection path of the external network for which the distribution related condition has been set.

[7] In accordance with a preferred embodiment according to any one of the content distribution devices mentioned above, the distribution related condition includes a viewing age condition for setting a viewing age. With this configuration, content selected based on the set viewing age can be distributed to the distribution terminal. As a result, only content that is suitable for the user's age can be distributed to the distribution terminal. Consequently, only content suitable for children can be distributed to distribution terminals used by children, for example.

[8] In accordance with a preferred embodiment according to any one of the content distribution devices mentioned above, the viewing age condition is settable for each age. In other words, the controller is configured to accept a setting of the viewing age condition for each age. This configuration allows a precise viewing age to be set. As a result, content suitable for the age of the user who will use the distribution terminal can be distributed to the distribution terminal.

[9] In accordance with a preferred embodiment according to any one of the content distribution devices mentioned above, the distribution related condition includes a genre condition for setting a genre. With this configuration, content selected based on the set genre can be distributed to the distribution terminal. As a result, it is possible to distribute only content of the genre that the user likes to the distribution terminal. This allows the user to easily view preferred content on the distribution terminal used by the user.

[10] In accordance with a preferred embodiment according to any one of the content distribution devices mentioned above, the distribution related condition includes a distribution time period condition for setting a time period in which the distribution of the content is permitted. With this configuration, content can be distributed to a distribution terminal during the time period in which it is desired to distribute the content, while restricting the distribution of the content to the distribution terminal during a time period in which it is not desired to distribute content. As a result, the distribution of nighttime content to a distribution terminal used by a child, for example, can be restricted so the child will not stay up too late, and in the daytime content can be distributed to the distribution terminal used by the child such that the content can be viewed.

[11] In accordance with a preferred embodiment according to any one of the content distribution devices mentioned above, the content distribution device further comprises a receiver configured to receive broadcast signal of a selected channel. The distribution related condition includes a channel condition for setting a channel whose distribution is permitted. With this configuration, it is possible to restrict the distribution of the content of channels not desired to be distributed to the distribution terminal. As a result, just content of channels preferred by the user can be distributed to the distribution terminal. This allows the user to easily view content of his favorite channels on the distribution terminal used by the user.

[12] In accordance with a preferred embodiment according to any one of the content distribution devices mentioned above, the distribution related condition includes an operation condition for setting a permitted operation related to the content. With this configuration, it is possible to restrict an operation related to content from being performed using a distribution terminal by which an operation related to content is not desired. As a result, it is possible to restrict undesired operations from being performed using a distribution terminal used by a child or a visitor, for example.

[13] In accordance with a preferred embodiment according to any one of the content distribution devices mentioned above, in this case, the permitted operation related to the content includes at least one of programmed recording, deletion, editing, and copying. With this configuration, it is possible to restrict programmed recording, deletion, editing, or copying from being performed using a distribution terminal by which an operation related to content is not desired.

[14] In accordance with a preferred embodiment according to any one of the content distribution devices mentioned above, the controller is configured to create a title list of the content based on the distribution related condition. With this configuration, the user can confirm content to which a distribution related condition has been applied as a title list on the distribution terminal used by the user. As a result, the user can easily select the content to be viewed from the title list of the content to which the distribution related condition has been applied.

[15] In accordance with a preferred embodiment according to any one of the content distribution devices mentioned above, the controller is configured to determine whether or not the distribution of the content is permitted based on the distribution related condition. With this configuration, it is possible to restrict the distribution of the content to a distribution terminal for which the distribution of the content is not desired. It is also possible to distribute content to the distribution terminal to which the distribution of the content is desired.

[16] In accordance with a preferred embodiment according to any one of the content distribution devices mentioned above, the controller is configured to perform control to distribute the content when the distribution of the content is permitted, and configured to perform control to notify that the content cannot be distributed when the distribution of the content is refused. With this configuration, when content distribution is permitted, the content can be reliably and quickly distributed to the distribution terminal. Also, when content distribution is refused, the user can be notified via the distribution terminal that the user uses that the content cannot be distributed. As a result, the user can ascertain that the content is not being distributed to the distribution terminal used by the user due to the setting, rather than the content not being distributed to the distribution terminal used by the user due some kind of problem.

[17] In accordance with a preferred embodiment according to any one of the content distribution devices mentioned above, the content distribution device further comprises a storage component configured to store the distribution related condition in association with each of the identifiers.

[18] In accordance with a preferred embodiment according to any one of the content distribution devices mentioned above, in response to the controller receiving a title list request from a distribution terminal, the controller is configured to transmit to the distribution terminal a title list of the content according to the distribution related condition corresponding to an identifier used by the distribution terminal.

[19] In accordance with a preferred embodiment according to any one of the content distribution devices mentioned above, in response to the controller receiving a content distribution request from a distribution terminal, the controller is configured to determine whether or not the distribution of the content to the distribution terminal is permitted according to the distribution related condition corresponding to an identifier used by the distribution terminal.

[20] In accordance with a preferred embodiment according to any one of the content distribution devices mentioned above, in response to the controller receiving a content operation request from a distribution terminal, the controller is configured to determine whether or not an operation related to the content is permitted according to the distribution related condition corresponding to an identifier used by the distribution terminal.

As described above, the present invention provides a content distribution device with which it is possible to save a trouble to set a distribution related condition for every distribution terminal, or a trouble to set a distribution related condition when a new distribution terminal is purchased, and to apply the distribution related condition that is suitable for the distribution terminal.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A content distribution device comprising:
   a communication component that communicates with an access point device having a plurality of identifiers, the identifiers including SSIDs (service set identifiers) that are wirelessly broadcast by the access point device and indicative of network names of wireless LANs that are established by the access point device and a stealth SSID that is set to stealth and indicative of a network name of a wireless LAN that is established by the access point device;
   a controller that sets a distribution related condition related to a distribution of content for each of the stealth SSID and the SSIDs; and
   a storage component that stores the distribution related condition in association with each of the stealth SSID and the SSIDs,
   in response to the controller receiving a content distribution request from a distribution terminal via the access point device, the controller
      obtaining, from the access point device, one of the stealth SSID and the SSIDs used by the distribution terminal to establish a wireless LAN between the distribution terminal and the access point device,
      searching, based on the obtained one of the stealth SSID and the SSIDs, a distribution related condition associated with the obtained one of the stealth SSID and the SSIDs from among the distribution related condition that has been stored in the storage component in association with each of the stealth SSID and the SSIDs, and
      executing the distribution of the content to the distribution terminal according to the searched distribution related condition that has been searched based on the obtained one of the stealth SSID and the SSIDs.

2. The content distribution device according to claim 1, wherein
   the controller controls a display component to display information for setting the distribution related condition for each of the stealth SSID and the SSIDs.

3. The content distribution device according to claim 2, wherein
   the controller controls the display component to display the stealth SSID and the SSIDs for selecting one of the stealth SSID and the SSIDs for which the distribution related condition is set.

4. The content distribution device according to claim 3, wherein
   the controller controls the display component to display a setting screen for setting the distribution related condition of the selected one of the stealth SSID and the SSIDs.

5. The content distribution device according to claim 1, wherein
   the access point device includes a wired LAN connection component to which a cable of a wired LAN is connected, and
   the controller sets the distribution related condition for a connection path of the wired LAN via the wired LAN connection component.

6. The content distribution device according to claim 1, wherein
   the access point device is connected to an external network, and
   the controller sets the distribution related condition for a connection path of the external network.

7. The content distribution device according to claim 1, wherein
   the distribution related condition includes a viewing age condition for setting a viewing age.

8. The content distribution device according to claim 7, wherein
   the viewing age condition is settable for each age.

9. The content distribution device according to claim 1, wherein
   the distribution related condition includes a genre condition for setting a genre.

10. The content distribution device according to claim 1, wherein
    the distribution related condition includes a distribution time period condition for setting a time period in which the distribution of the content is permitted.

11. The content distribution device according to claim 1, further comprising
    a receiver that receives broadcast signal of a selected channel,
    the distribution related condition including a channel condition for setting a channel whose distribution is permitted.

12. The content distribution device according to claim 1, wherein
    the distribution related condition includes an operation condition for setting a permitted operation related to the content.

13. The content distribution device according to claim 12, wherein
    the permitted operation related to the content includes at least one of programmed recording, deletion, editing, and copying.

14. The content distribution device according to claim 1, wherein
    the controller creates a title list of the content based on the distribution related condition.

15. The content distribution device according to claim 1, wherein
    the controller determines whether or not the distribution of the content is permitted based on the distribution related condition.

16. The content distribution device according to claim 1, wherein
    the controller performs control to distribute the content when the distribution of the content is permitted, and performs control to notify that the content cannot be distributed when the distribution of the content is refused.

17. The content distribution device according to claim 1, wherein
    in response to the controller receiving a title list request from a distribution terminal, the controller transmits to the distribution terminal a title list of the content according to the distribution related condition corresponding to the one of the stealth SSID and the SSIDs used by the distribution terminal.

18. The content distribution device according to claim 1, wherein in response to the controller receiving a content operation request from a distribution terminal, the controller determines whether or not an operation related to the content is permitted according to the distribution related condition corresponding to the one of the stealth SSID and the SSIDs used by the distribution terminal.

* * * * *